(12) United States Patent
Nakamura

(10) Patent No.: US 10,598,978 B2
(45) Date of Patent: Mar. 24, 2020

(54) ELECTRO-OPTICAL DEVICE AND ELECTRONIC APPARATUS

(71) Applicant: SEIKO EPSON CORPORATION, Tokyo (JP)

(72) Inventor: Teiichiro Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/285,600

(22) Filed: Feb. 26, 2019

(65) Prior Publication Data
US 2019/0265541 A1 Aug. 29, 2019

(30) Foreign Application Priority Data
Feb. 27, 2018 (JP) .................. 2018-032899

(51) Int. Cl.
| | | |
|---|---|---|
| *G02F 1/1335* | (2006.01) | |
| *G03B 21/00* | (2006.01) | |
| *G02F 1/1345* | (2006.01) | |
| *G02F 1/1333* | (2006.01) | |

(52) U.S. Cl.
CPC ...... *G02F 1/133512* (2013.01); *G02F 1/1345* (2013.01); *G02F 1/133502* (2013.01); *G03B 21/006* (2013.01); *G02F 2001/133388* (2013.01); *G02F 2203/01* (2013.01)

(58) Field of Classification Search
CPC .................................. G02F 1/133512
See application file for complete search history.

(56) References Cited

U.S. PATENT DOCUMENTS

2015/0002790 A1* 1/2015 Ito ............... G02F 1/133526
349/95

FOREIGN PATENT DOCUMENTS

| JP | 2002-122855 A | 4/2002 |
| JP | 2003-140129 A | 5/2003 |
| JP | 2005-326608 A | 11/2005 |
| JP | 2013-65034 A | 4/2013 |
| JP | 2016-177230 A | 10/2016 |

* cited by examiner

*Primary Examiner* — Edmond C Lau
(74) *Attorney, Agent, or Firm* — Oliff PLC

(57) ABSTRACT

A second substrate of an electro-optical device includes a first light-shielding layer formed around a display region, and a peripheral region of a first substrate is provided with a second light-shielding layer, a third light-shielding layer, and a translucent region overlapping neither the second light-shielding layer nor the third light-shielding layer. A maximum incident angle θ of light-source light being incident on an electro-optical layer from the second substrate, a maximum width W of the translucent region, and a thickness d between an end portion on an edge of the third light-shielding layer at a side opposite to the first light-shielding layer, and the first light-shielding layer satisfy the following relationship:

$$W < 2 \times d \times \tan \theta.$$

10 Claims, 13 Drawing Sheets

ELECTRO-OPTICAL DEVICE AND ELECTRONIC APPARATUS

BACKGROUND

1. Technical Field

The invention relates to an electro-optical device including a peripheral circuit provided in a peripheral region surrounding a display region, and an electronic apparatus.

2. Related Art

A transmissive-type electro-optical device used as a light valve and the like of a projection-type display apparatus includes a first substrate including a pixel electrode having translucency and provided at one surface side of the first substrate having translucency, and a second substrate facing the first substrate, including a common electrode having translucency and provided on a surface of the second substrate located on the first substrate side, and an electro-optical layer is provided between the first substrate and the second substrate. In such an electro-optical device, while light-source light being incident from the second substrate side is emitted from the first substrate side, the light-source light is modulated for each of pixels by the electro-optical layer. At that time, the modulated light may be reflected by an optical system, a wire grid polarized light separating element, or the like disposed on the emission side of the modulated light with respect to the first substrate, and becomes incident again on the first substrate as return light. When such return light becomes incident on a peripheral region surrounding a display region, the return light is further reflected (re-reflected) by wiring provided in a peripheral circuit, and thus a blurred edge is to appear around an image on a screen. A low reflective film is proposed to be provided in the peripheral region to prevent deterioration of display quality due to re-reflection of the return light (see JP-A-2003-140129).

Moreover, proposed is a configuration in which a light-shielding layer of the upper layer side is provided as a light-shielding film in a peripheral region to overlap in a plan view with a gap created between light-shielding layers of the bottom layer side provided in a peripheral circuit (see JP-A-2013-65034).

However, when the light-shielding layer entirely formed over a wide range to surround the display region as in the configuration described in JP-A-2003-140129, a crack is likely to be generated in a film constituting the light-shielding layer. Thus, light passes through the crack in the light-shielding layer to be emitted from the first substrate toward the side opposite to the second substrate (the side closer to the screen).

Moreover, in the peripheral circuit formed in the peripheral region, a plurality of unit circuits is arranged in correspondence with data lines or scan lines to reduce area occupied by the peripheral circuit in accordance with a predetermined rule. Thus, as described in JP-A-2013-65034, there is such an issue that the light-shielding layer of the upper layer side being a layer different from the light-shielding layers of the bottom layer side is occasionally difficult to be provided to overlap in a plan view with all the gaps created between the light-shielding layers of the bottom layer side. Further, when an attempt is made to provide a light-shielding layer being a different layer and overlapping in a plan view with all the gaps created between the light-shielding layers, there is such an issue that counter-measures accompanying an increase in a manufacturing cost due to, for example, a modification of a process, an increase in wiring layers, and an enlargement of the peripheral region become necessary.

SUMMARY

In view of the above-described issues, an advantage of some aspects of the invention is to provide an electro-optical device and an electronic apparatus capable of suppressing deterioration of image quality due to return light being obliquely incident on a peripheral region, without using a configuration in which the light-shielding layer is entirely provided, or a configuration in which all the gaps created between light-shielding layers are covered with a light-shielding layer being a different layer.

To achieve the above-described advantage, according to an aspect of the invention, an electro-optical device includes an electro-optical panel including a first substrate, a second substrate facing the first substrate, and an electro-optical layer provided between the first substrate and the second substrate, and in the electro-optical device, the second substrate includes a first light-shielding layer in a peripheral region surrounding a display region of the electro-optical panel, and the first substrate includes, in a peripheral region surrounding the display region of the electro-optical panel, a second light-shielding layer, a third light-shielding layer disposed in a layer located between the second light-shielding layer and the first light-shielding layer, and a translucent region overlapping neither the second light-shielding layer nor the third light-shielding layer between a first edge and a second edge when the second substrate is viewed from the first substrate side, the first edge and the second edge being two edges, which are spaced apart from each other, of the second light-shielding layer and the third light-shielding layer, and wherein when a maximum incident angle of light-source light being incident on the electro-optical layer from the second substrate is θ, a maximum width of the translucent region is W, a thickness between an end portion on the first edge at a side opposite to the first light-shielding layer, and the first light shielding layer is d1, and a thickness between an end portion on the second edge at a side opposite to the first light-shielding layer, and the first light-shielding layer is d2, the maximum incident angle θ, the width W, the thickness d1, and the thickness d2 satisfy the following relationship:

$$W<(d1\times\tan\theta+d2\times\tan\theta).$$

According to the aspect of the invention, since the peripheral region of the first substrate is provided with the second light-shielding layer, and the third light-shielding layer disposed in the layer located between the second light-shielding layer and the first light-shielding layer, even when return light becomes incident on the peripheral region, the return light is blocked by the second light-shielding layer or the third light-shielding layer. Moreover, the peripheral region of the first substrate is provided with the translucent region defined by the end portion of one of the second light-shielding layer and the third light-shielding layer, and the translucent region overlaps neither the second light-shielding layer nor the third light-shielding layer, but the first light-shielding layer is provided in the peripheral region of the second substrate. Moreover, the maximum incident angle θ of the light-source light incident on the electro-optical layer from the second substrate, the maximum width W of the translucent region, the thickness d1 between the end portion on the first edge of the third light-shielding layer at the side opposite to the first light-shielding layer, and the first light shielding layer, and the thickness d2 between the end portion on the second edge of the third light-shielding layer at the side opposite to the first light-shielding layer, and the first light-shielding layer satisfy the following relationship:

$$W<(d1\times\tan\theta+d2\times\tan\theta).$$

Accordingly, the return light incident on the translucent region reaches the first light-shielding layer and is absorbed by the first light-shielding layer, or is reflected by the first light-shielding layer to be directed toward the third light-shielding layer or the second light-shielding layer. Therefore, even when a configuration in which a light-shielding layer is entirely provided or a configuration in which all the gaps created between the light-shielding layers of the bottom layer side are covered with the light-shielding layer of the upper layer side is not employed, return light is less likely to be emitted from the first substrate to the side opposite to the second substrate. Thus, deterioration of image quality due to return light being obliquely incident on the peripheral region can be suppressed.

According to an aspect of the invention, the third light-shielding layer can include a metal layer, a first low reflection layer overlaid on the metal layer at the first substrate side and having lower reflectance than reflectance of the metal layer, and a second low reflection layer overlaid on the metal layer at the second substrate side and having lower reflectance than reflectance of the metal layer. According to such an aspect, the third light-shielding layer can absorb return light advancing from the first substrate side toward the third light-shielding layer and return light advancing from the second substrate side toward the third light-shielding layer.

According to an aspect of the invention, the third light-shielding layer can include light-shielding wiring electrically connected to a semiconductor element formed in the peripheral region.

According to an aspect of the invention, a plurality of unit circuits each including the semiconductor element can be arranged in the peripheral region. In such an aspect, since unit pixels are arranged to reduce area occupied by the peripheral circuit, restriction on arrangement of the third light-shielding layer increases, but it is only necessary to provide the third light-shielding layer in some gaps created between the second light-shielding layers. Accordingly, the third light-shielding layer can be disposed readily without modifying the arrangement of the unit circuits.

According to an aspect of the invention, the first edge and the second edge both can include an edge of the third light-shielding layer.

According to an aspect of the invention, the first edge and the second edge both can include an edge of the second light-shielding layer.

According to an aspect of the invention, the first edge can include an edge of the third light-shielding layer and the second edge can include an edge of the second light-shielding layer.

According to an aspect of the invention, the electro-optical device can include a holder configured to cover the electro-optical panel, and in the electro-optical device, the holder includes a first end plate portion having a light-shielding property and configured to cover a surface of the second substrate on a side opposite to the first substrate, and a second end plate portion having a light-shielding property and configured to cover a surface of the first substrate on a side opposite to the second substrate, and wherein the first end plate portion is provided with a first opening portion overlapping the display region, and the second end plate portion is provided with a second opening portion overlapping the display region. According to such an aspect, incidence of return light can be restricted by the holder.

The electro-optical device according to an aspect of the invention can be used for various electronic apparatuses. When an electronic apparatus is applied to a projection-type display device, the electronic apparatus includes a light-source unit configured to emit light-source light to be supplied to the electro-optical device, and a projection optical system configured to project light modulated by the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
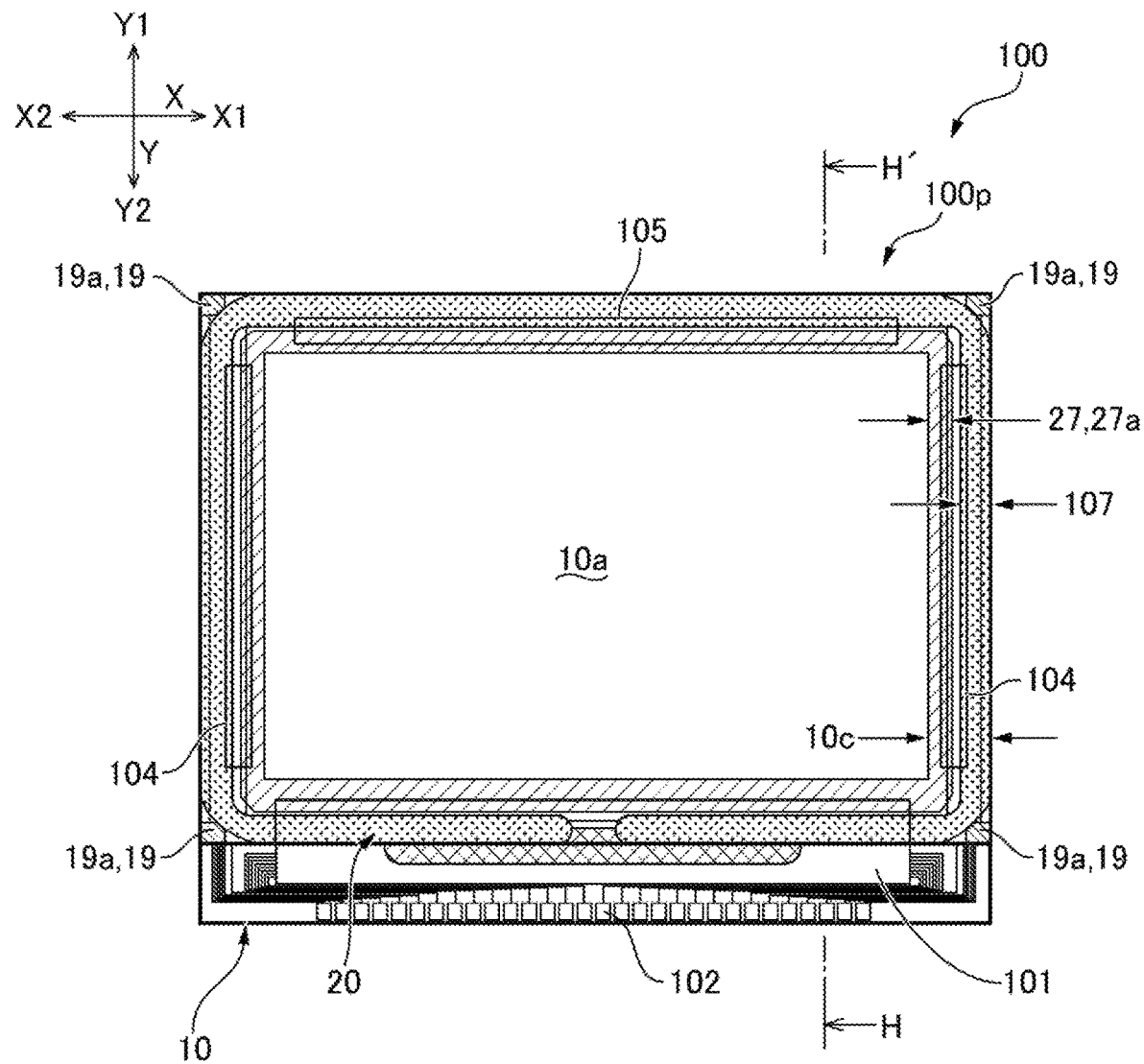
FIG. 1 is a plan view of an electro-optical panel of an electro-optical device to which the invention is applied.

Exemplary embodiments of the invention will be described below with reference to the drawings. Note that, in each of the figures to be referred to in the following description, to illustrate each layer, each member, and the like in a recognizable size in the drawings, each layer, each member, and the like are illustrated at a different scale. Moreover, in the description described below, when a layer formed in a first substrate is described, the upper layer side or the front surface side means the side (the side on which a second substrate is located) opposite to the side on which a substrate body is located, and the bottom layer side means the side on which the substrate body is located. Moreover, in the invention, a "plan view" means a state as viewed from a normal direction with respect to a first substrate 10.

Configuration of Electro-Optical Device

Figure 2:
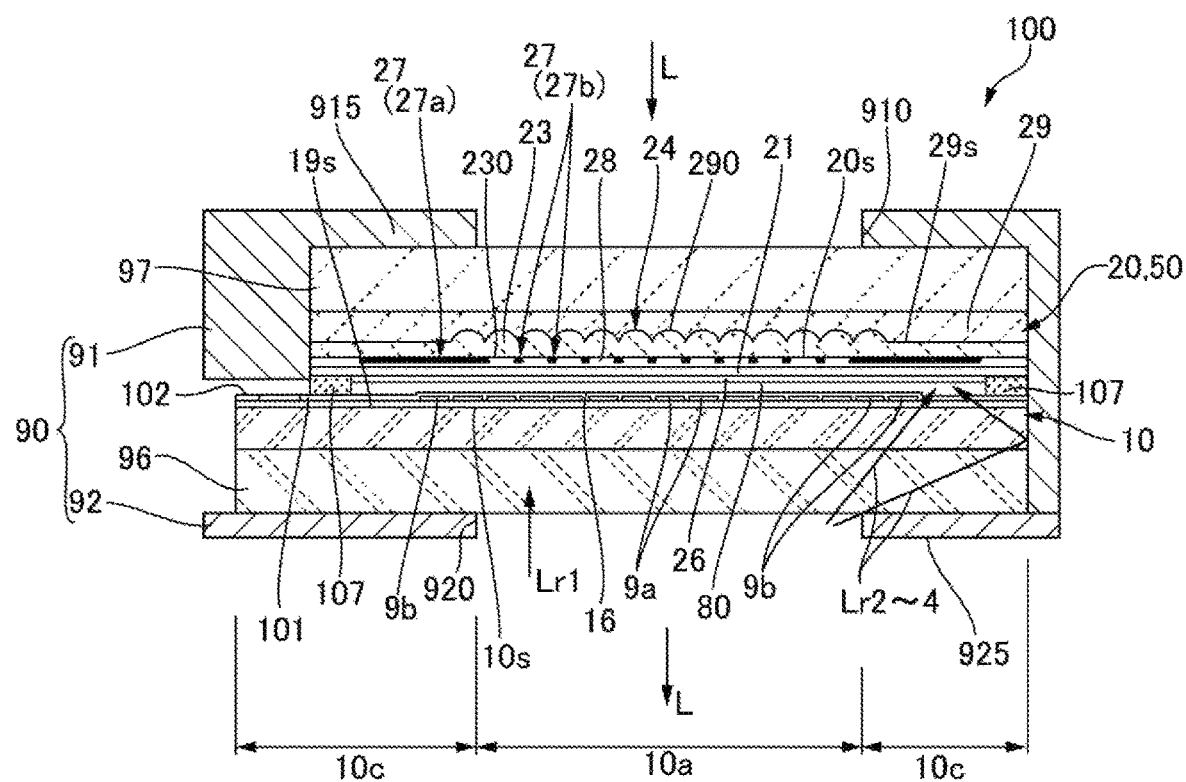
FIG. 2 is a cross-sectional view of the electro-optical panel and the like illustrated in FIG. 1.

FIG. 1 is a plan view of an electro-optical panel 100p of an electro-optical device 100 to which the invention is applied. FIG. 2 is a cross-sectional view of the electro-optical panel 100p and the like illustrated in FIG. 1. As illustrated in FIG. 1 and FIG. 2, the electro-optical device 100 includes the electro-optical panel 100p in which the first substrate 10 and a second substrate 20 are bonded together with a seal material 107 via a predetermined gap between the first substrate 10 and the second substrate 20. In the electro-optical panel 100p, the seal material 107 is provided in conformance with an outer edge of the second substrate 20 to form a frame-like shape, and an electro-optical layer 80 such as a liquid crystal layer is disposed in a region surrounded by the seal material 107 between the first substrate 10 and the second substrate 20. Accordingly, the electro-optical device 100 is constituted as a liquid crystal device. The seal material 107 is a photocurable adhesive, or a photocurable and thermosetting adhesive, and a gap material such as glass fiber or glass beads for setting a distance between the substrates to a predetermined value is compounded in the seal material 107. Any of the first substrate 10 and the second substrate 20 is formed in a quadrangular shape, and a display region 10a described below in which a plurality of pixels is arranged is provided as a rectangular region in a substantially central portion of the electro-optical device 100, and the display region 10a is surrounded by a peripheral region 10c. In this exemplary embodiment, in a region adjacent to the display region 10a in the peripheral region 10c, dummy pixel electrodes 9b formed concurrently with pixel electrodes 9a are formed.

The first substrate 10 includes a translucent substrate such as a quartz substrate and a glass substrate. On one surface 10s side located on the second substrate 20 side of the first substrate 10, in the peripheral region 10c, a data line driving circuit 101 (peripheral circuit 106) and a plurality of terminals 102 are formed along one of sides of the first substrate 10, and scan line driving circuits 104 (peripheral circuit 106) are formed along other two sides adjacent to the one side, and an inspection circuit 105 (peripheral circuit 106) is formed along the side opposite to the side along which the plurality of terminals 102 are located. A flexible wiring substrate (not illustrated) is connected to the terminals 102, and various potentials and various signals are input to the first substrate 10 via the flexible wiring substrate.

In the display region 10a on the one surface 10s of the first substrate 10, the plurality of pixel electrodes 9a having translucency and including an Indium Tin Oxide (ITO) film or the like, and pixel switching elements (not illustrated) each of which electrically being connected to each of the plurality of pixel electrodes 9a are formed in a matrix pattern. A first orientation film 16 is formed on the second substrate 20 side with respect to the pixel electrodes 9a, and the pixel electrodes 9a are covered with the first orientation film 16.

The second substrate 20 includes a translucent substrate such as a quartz substrate or a glass substrate. A common electrode 21 having translucency and including an ITO film or the like is formed on one surface 20s side facing the first substrate 10 in the second substrate 20, and a second orientation film 26 is formed on the first substrate 10 side with respect to the common electrode 21. The common electrode 21 is formed over substantially the entire surface of the second substrate 20, and is covered with the second orientation film 26. On the one surface 20s side of the second substrate 20, a light-shielding layer 27 having a light-shielding property and including a resin, metal, or a metal compound is formed on the side opposite to the first substrate 10 with respect to the common electrode 21. A protective layer 28 having translucency is formed between the light-shielding layer 27 and the common electrode 21.

The light-shielding layer 27 is formed, for example, as a first light-shielding layer 27a having a frame-like shape and extending along an outer peripheral edge of the display region 10a, and the display region 10a is defined by an inner edge of the first light-shielding layer 27a. Accordingly, the first light-shielding layer 27a surrounds the display region 10a. The light-shielding layer 27 is also formed as a black matrix 27b in regions overlapping in a plan view with regions each located between the pixel electrodes 9a adjacent to each other.

Any of the first orientation film 16 and the second orientation film 26 is an inorganic orientation film (vertical orientation film) including an oblique deposition film of $SiO_x$ (x<2), $SiO_2$, $TiO_2$, MgO, $Al_2O_3$, and the like, and liquid crystal molecules having negative dielectric anisotropy used for the electro-optical layer 80 are tilt-oriented. Therefore, the liquid crystal molecules form a predetermined angle with respect to the first substrate 10 and the second substrate 20. In this way, the electro-optical device 100 is constituted as a liquid crystal device of a Vertical Alignment (VA) mode.

The second substrate 20 is constituted as a lens array substrate 50 on which a plurality of lenses 24 each overlapping each of the plurality of pixel electrodes 9a in a one-to-one relationship in a plan view is formed, and the lenses 24 serve to effectively guide light into an opening region of the first substrate 10. In constituting such lenses 24, on one surface 29s of a substrate body 29 of the second substrate 20, each of concave curved surfaces 290 is formed at a position overlapping each of the plurality of pixel electrodes 9a in a one-to-one relationship, and in the substrate body 29, a translucent layer 23 configured to cover the concave curved surfaces 290 is formed. A surface 230 on the side opposite to the substrate body 29 of the translucent layer 23 forms a flat surface, and the light-shielding layer 27 and the like are formed on the surface 230. The translucent layer 23 has a higher refractive index than a refractive index of the substrate body 29. For example, the substrate body 29 includes a glass substrate or a quartz substrate (refractive index is equal to 1.48), and the translucent layer 23 includes a silicon oxynitride film (refractive index ranges from 1.58 to 1.68) or the like. Therefore, the lenses 24 each have a positive power.

In the peripheral region 10c of the first substrate 10, inter-substrate conduction electrodes 19 are formed in regions overlapping corner portions of the second substrate 20. Inter-substrate conduction materials 19a each including conductive particles are disposed in the inter-substrate conduction electrodes 19. The common electrode 21 of the second substrate 20 is electrically connected to the first substrate 10 side via the inter-substrate conduction materials 19a and the inter-substrate conduction electrodes 19. Therefore, a common potential is applied to the common electrode 21 from the first substrate 10 side.

In the electro-optical device 100 of the exemplary embodiment, the pixel electrodes 9a and the common electrode 21 are formed of an ITO film (translucent conductive film), and the electro-optical device 100 is constituted as a transmissive liquid crystal device. In such an electro-optical device 100, as indicated by an arrow L in FIG. 2, while light incident from the second substrate 20 passes through the first substrate 10 and is emitted, the light is modulated by the electro-optical layer 80 for each of the pixels.

Electrical Configuration of Electro-Optical Device 100

Figure 3:
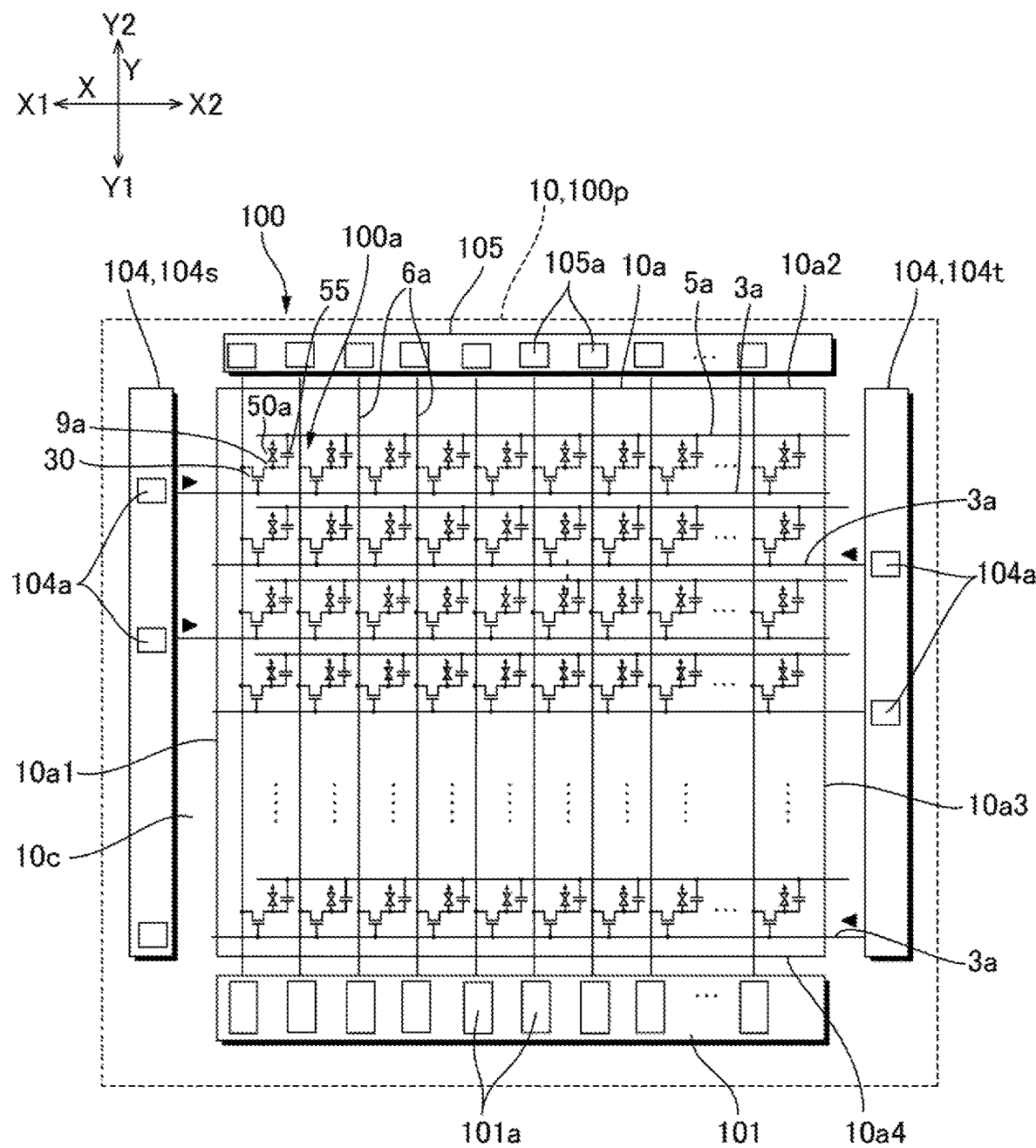
FIG. 3 is an explanatory view illustrating an electrical configuration of the electro-optical device illustrated in FIG. 1.

FIG. 3 is an explanatory view illustrating an electrical configuration of the electro-optical device 100 illustrated in FIG. 1. In FIG. 3, in the electro-optical device 100, the electro-optical panel 100p includes the display region 10a in which a plurality of pixels 100a are arranged in a matrix pattern in a central region of the display region 10a. In the electro-optical panel 100p, in the first substrate 10 described above with reference to FIG. 1, FIG. 2, and the like, a plurality of scan lines 3a extending in a first direction X and a plurality of data lines 6a extending in a second direction Y are formed on the inner side of the display region 10a, and the plurality of pixels 100a are constituted in correspondence with intersections between the plurality of scan lines 3a and the plurality of data lines 6a. The plurality of scan lines 3a is electrically connected to the scan line driving circuits 104 and the plurality of data lines 6a is connected to the data line driving circuit 101. Moreover, the inspection circuit 105 is electrically connected to the plurality of data lines 6a on the side opposite to the data line driving circuit 101 in the second direction Y.

In each of the plurality of pixels 100a, a pixel switching element 30 including a field effect transistor or the like, and the pixel electrode 9a electrically connected to the pixel switching element 30 are formed. Each of the data lines 6a is electrically connected to a source of the pixel switching element 30, each of the scan lines 3a is electrically connected to a gate of the pixel switching element 30, and the pixel electrode 9a is electrically connected to a drain of the pixel switching element 30. An image signal is supplied to the data line 6a, and a scan signal is supplied to the scan line 3a. In the exemplary embodiment, the scan line driving circuits 104 are constituted as scan line driving circuits 104s and 104t on one side X1 and the other side X2 in the first direction X with respect to the display region 10a, and the scan line driving circuit 104s on the one side X1 in the first direction X is constituted to drive the scan lines 3a of odd numbers, and the scan line driving circuit 104t on the other side X2 in the first direction X is configured to drive the scan lines 3a of even numbers.

In each of the pixels 100a, the pixel electrode 9a faces the common electrode 21 of the second substrate 20 described above with reference to FIG. 1 and FIG. 2 via the electro-optical layer 80, and constitutes a liquid crystal capacitor 50a. A holding capacitor 55 disposed in parallel with the liquid crystal capacitor 50a is added to each pixel 100a to prevent fluctuations of an image signal held by the liquid crystal capacitor 50a. In the exemplary embodiment, capacitance lines 5a extending across the plurality of pixels 100a are formed in the first substrate 10 to constitute the holding capacitors 55, and a common potential is supplied to the capacitance lines 5a.

In this way, in the electro-optical device 100 of the exemplary embodiment, on the first substrate 10, the data line driving circuit 101, the scan line driving circuit 104, and the inspection circuit 105 are each constituted as the peripheral circuit 106 in the peripheral region 10c surrounding the display region 10a. Here, in the data line driving circuit 101, a sampling circuit and the like includes a unit circuit 101a provided for each data line 6a, and the scan line driving circuit 104 includes a unit circuit 104a provided for each scan line 3a, and the inspection circuit 105 includes a unit circuit 106a provided for each data line 6a.

Configuration of Holder 90

Figure 4:
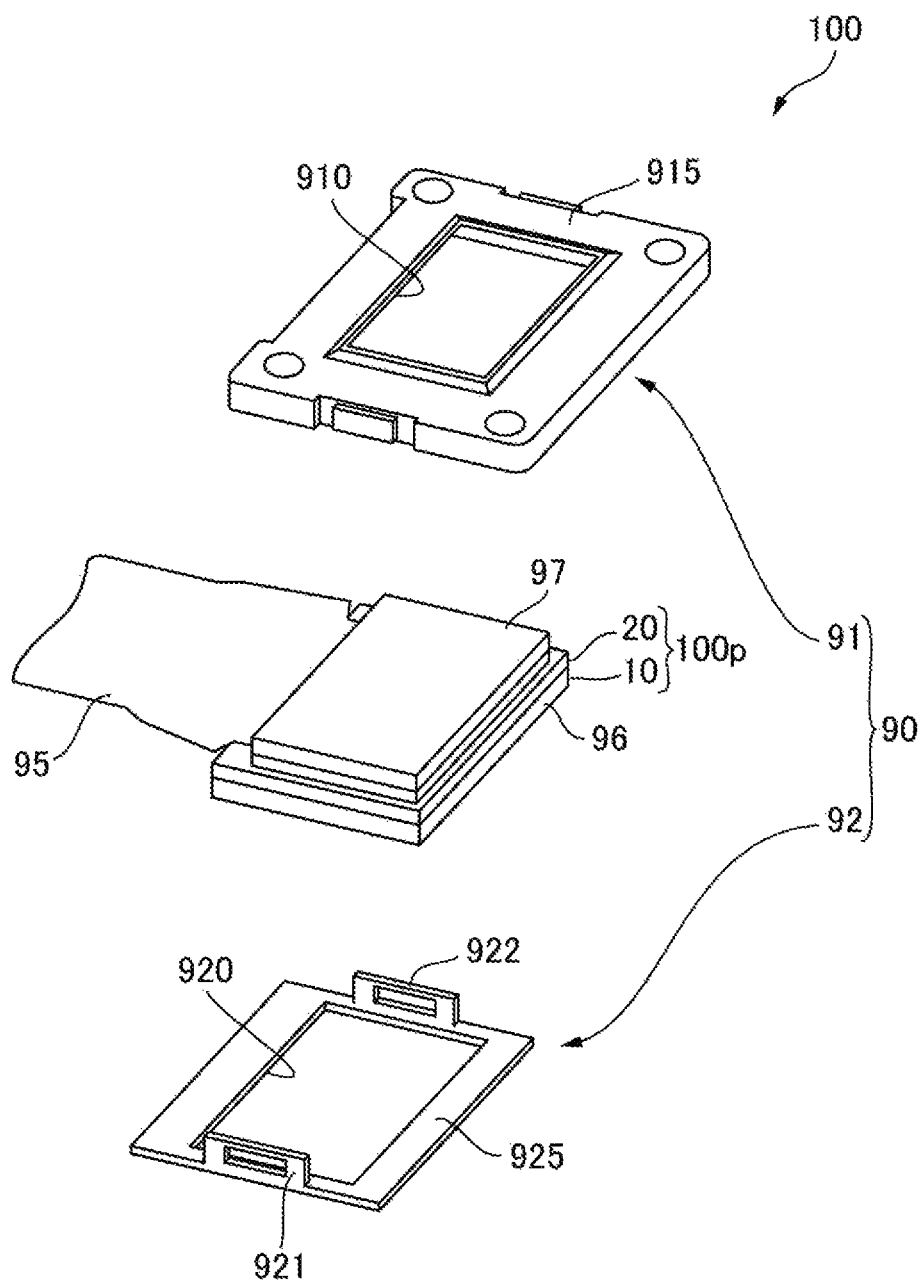
FIG. 4 is an exploded perspective view of the electro-optical device to which the invention is applied.

FIG. 4 is an exploded perspective view of the electro-optical device 100 to which the invention is applied. As illustrated in FIG. 2 and FIG. 4, when the electro-optical panel 100p described with reference to FIG. 1 and FIG. 2 is applied to a projection-type display device and the like to be described below, in the electro-optical device 100, the electro-optical panel 100p is held by the holder 90 in a state where a first dust-proof glass 96 is affixed to a surface on the first substrate 10 side of the electro-optical panel 100p and a second dust-proof glass 97 is affixed to a surface on the second substrate 20 side.

The holder 90 includes a frame 91 configured to house the electro-optical panel 100p and a cover member 92 configured to cover the frame 91. The electro-optical panel 100p is housed to position the second substrate 20 and the second dust-proof glass 97 on the frame 91 side, and the cover member 92 is disposed on the side of the first substrate 10 and the first dust-proof glass 96. Accordingly, a first end plate portion 915 having a light-shielding property of the frame 91 overlaps the second dust-proof glass 97, and a second end plate portion 925 having a light-shielding property of the cover member 92 overlaps the first dust-proof glass 96. In this state, the frame 91 is coupled to the cover member 92 by engagement of coupling plate portions 921 and 922 each protruding from the cover member 92 with side surfaces of the frame 91. A flexible wiring substrate 95 connected to the first substrate 10 is led out from between the frame 91 and the cover member 92. In the exemplary embodiment, a surface on the inner side (the second dust-proof glass 97 side) of the first end plate portion 915 of the frame 91 forms a low reflection layer, and a surface on the inner side (the first dust-proof glass 96 side) of the second end plate portion 925 of the cover member 92 forms a low reflection layer.

A first opening portion 910 is formed in a region overlapping in a plan view with the display region 10a in the first end plate portion 915 of the frame 91, and a second opening portion 920 is formed in a region overlapping in a plan view the display region 10a in the second end plate portion 925 of the cover member 92.

Specific Configuration of Pixel 100p

Figure 5:
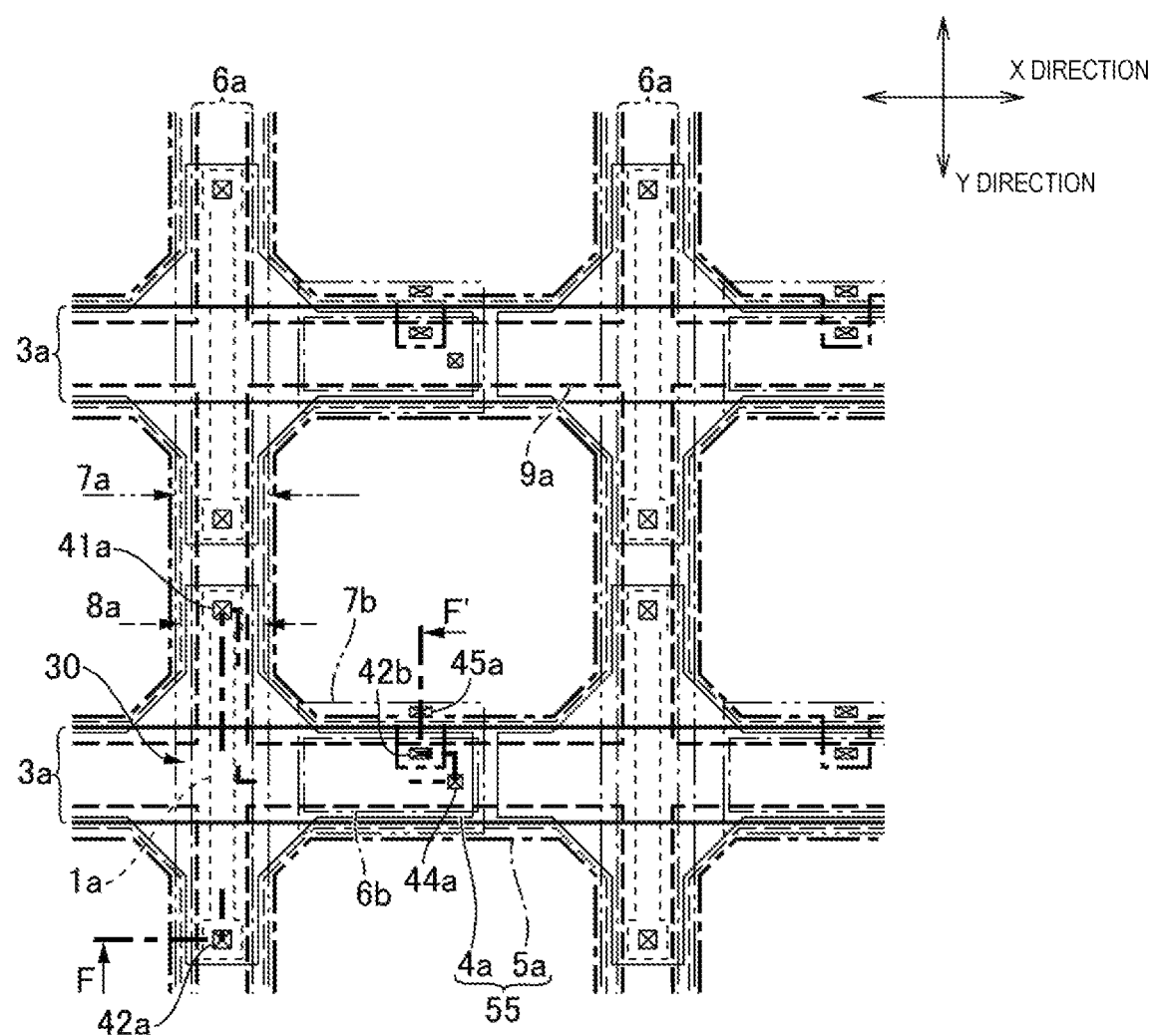
FIG. 5 is a plan view illustrating a plurality of pixels adjacent to one another in the electro-optical device to which the invention is applied.
Figure 6:
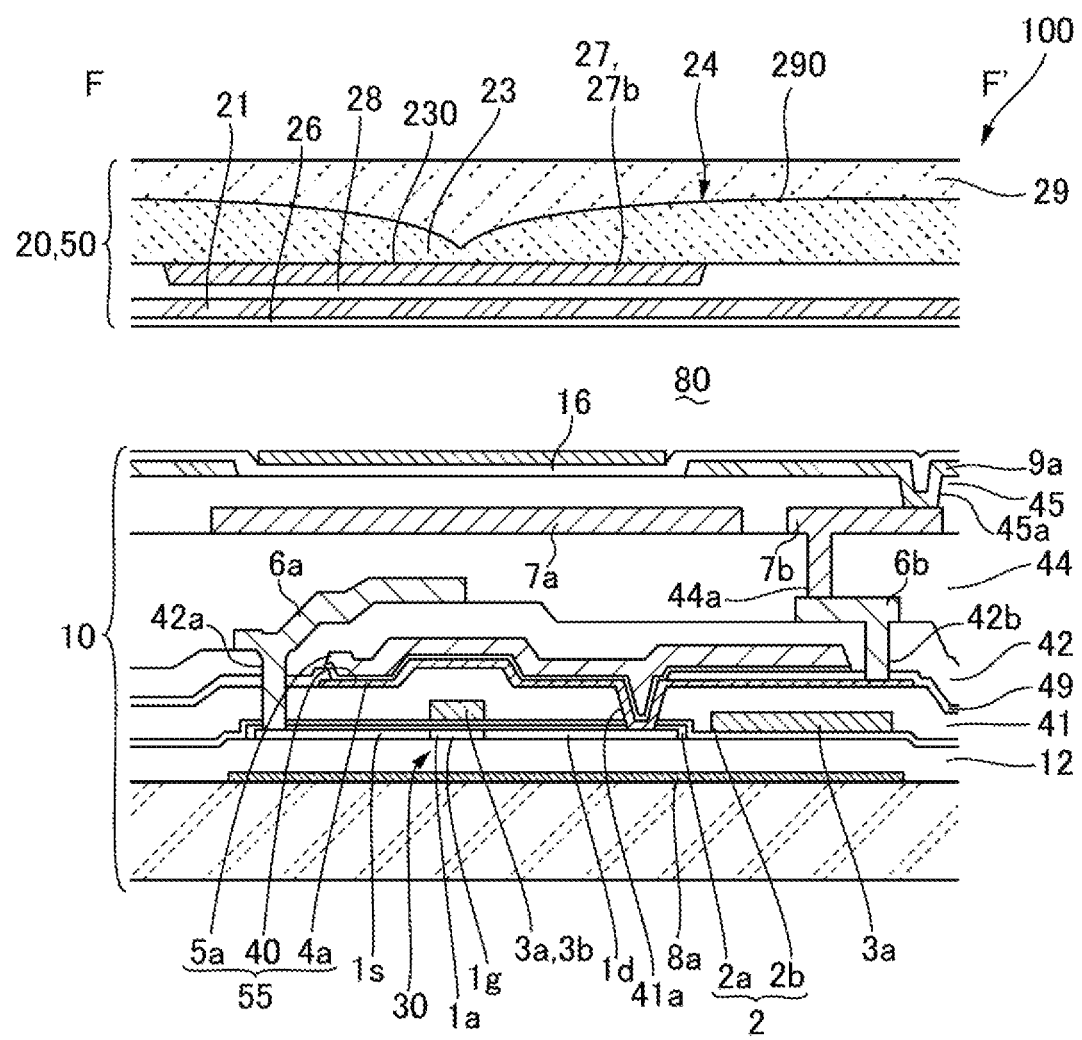
FIG. 6 is a cross-sectional view taken along line F-F' of the electro-optical device to which the invention is applied.

FIG. 5 is a plan view of the plurality of pixels adjacent to one another in the electro-optical device 100 to which the invention is applied. FIG. 6 is a cross-sectional view taken along line F-F' of the electro-optical device 100 to which the invention is applied. Note that, in FIG. 5, each layer is indicated by a line described below. Moreover, note that, in FIG. 5, as for layers including ends overlapping each other in a plan view, positions of the end portions are displaced to make shapes and the like of the layers readily recognizable.

A light-shielding layer 8a: a thin and long dashed line
A semiconductor layer 1a: a thin and short dotted line
The scan line 3a: a thick solid line
A drain electrode 4a: a thin solid line
The data line 6a and a relay electrode 6b: a thin long dashed short dashed line
The capacitance line 5a: a thick long dashed short dashed line An upper layer side light-shielding layer 7a and a relay electrode 7b: a thin long double-short dashed line The pixel electrode 9a: a thick dashed line As illustrated in FIG. 5, on a surface facing the second substrate 20 of the first substrate 10, the pixel electrode 9a is formed in each of the plurality of pixels, and the data lines 6a and the scan lines 3a are formed along inter-pixel regions each formed between the pixel electrodes 9a adjacent to each other. The inter-pixel regions extend lengthwise and crosswise. The scan lines 3a linearly extend along first inter-pixel regions extending in the first direction X of the inter-pixel regions, and the data lines 6a linearly extend along second inter-pixel regions extending in the second direction Y of the inter-pixel regions. Moreover, the pixel switching elements 30 are formed in correspondence with intersections between the data lines 6a and the scan lines 3a, and in the exemplary embodiment, the pixel switching elements 30 are formed by utilizing intersection regions between the data lines 6a and the scan lines 3a and vicinities of the intersection regions. The capacitance lines 5a are formed on the first substrate 10, and a common potential Vcom is applied to the capacitance lines 5a. The capacitance lines 5a extend to overlap the scan lines 3a and the data line 6a, and are formed to have a lattice shape. On the upper layer side of the pixel switching element 30, the upper layer side light-shielding layer 7a is formed, and the upper layer side light-shielding layer 7a extends to overlap the data line 6a and the scan line 3a. Accordingly, when light-source light is incident from the second substrate 20 side, the light-source light can be prevented from being incident on the pixel switching element 30. On the bottom layer side of the pixel switching element 30, a light-shielding layer 8a is formed, and the light-shielding layer 8a extends to overlap the scan line 3a and the data line 6a.

As illustrated in FIG. 6, in the first substrate 10, on the one surface 10s, the light-shielding layer 8a including a conductive film such as a conductive polysilicon film, a metal silicide film, a metal film, or a metal compound film is formed. The light-shielding layer 8a includes a light-shielding film such as a tungsten silicide (WSi) film, a tungsten film, and a titanium nitride film. The light-shielding layer 8a may also be constituted as a scan line. In this case, a configuration described below in which a gate electrode 3b and the light-shielding layer 8a are brought into conduction with each other is obtained.

On the one surface 10s side of the first substrate 10 and on the upper layer side of the light-shielding layer 8a, an insulating film 12 having translucency and including, for example, a silicon oxide film is formed, and on the upper layer side of the insulating film 12, the pixel switching element 30 including a semiconductor layer 1a is formed. The pixel switching element 30 includes the semiconductor layer 1a including long sides oriented in an extending direction of the data line 6a, and the gate electrode 3b extending in a direction orthogonal to a longitudinal direction of the semiconductor layer 1a, and overlapping a central portion in the longitudinal direction of the semiconductor layer 1a. In the exemplary embodiment, the gate electrode 3b includes a portion of the scan line 3a. The pixel switching element 30 includes a gate insulating layer 2 having translucency between the semiconductor layer 1a and the gate electrode 3b. The semiconductor layer 1a includes a channel region 1g facing the gate electrode 3b via the gate insulating layer 2, and also includes a source region is and a drain region 1d on both sides of the channel region 1g, respectively. In the exemplary embodiment, the pixel switching element 30 has an LDD structure. Accordingly, each of the source region is and the drain region 1d includes a low-concentration region on each of both the sides of the channel region 1g, and includes a high-concentration region in an adjacent region on the side opposite to the channel region 1g with respect to the low-concentration region.

The semiconductor layer 1a includes a polysilicon film (polycrystalline silicon film) or the like. The gate insulating layer 2 includes a two-layer structure including a first gate insulating layer 2a including a silicon oxide film formed by thermally oxidizing the semiconductor layer 1a, and a second gate insulating layer 2b including a silicon oxide film formed by, for example, a low pressure CVD method. The gate electrode 3b and the scan line 3a each include a conductive film such as a conductive polysilicon film, a metal silicide film, a metal film, or a metal compound film.

On the upper layer side of the gate electrode 3b, an inter-layer insulating film 42 having translucency and including, for example, a silicon oxide film is formed. On an upper layer of an inter-layer insulating film 41, a drain electrode 4a is formed. The drain electrode 4a includes a conductive film such as a conductive polysilicon film, a metal silicide film, a metal film, or a metal compound film. The drain electrode 4a is formed to partially overlap the drain region 1d of the semiconductor layer 1a, and is in conduction with the drain region 1d via a contact hole 41a passing through the inter-layer insulating film 41 and the gate insulating layer 2.

On the upper layer side of the drain electrode 4a, an etching stopper layer 49 having translucency and including, for example, a silicon oxide film, and a dielectric layer 40 having translucency are formed. On the upper layer side of the dielectric layer 40, the capacitance line 5a is formed. As the dielectric layer 40, a silicon compound such as a silicon oxide film or a silicon nitride film can be used. In addition, a dielectric layer having a high dielectric constant such as an aluminum oxide film, a titanium oxide film, a tantalum oxide film, a niobium oxide film, a hafnium oxide film, a lantern oxide film, and a zirconium oxide film can be used. The capacitance line 5a includes a conductive film such as a conductive polysilicon film, a metal silicide film, a metal film, or a metal compound film. The capacitance line 5a overlaps the drain electrode 4a via the dielectric layer 40, and constitutes the holding capacitor 55.

On the upper layer side of the capacitance line 5a, the inter-layer insulating film 42 having translucency and including, for example, a silicon oxide film is formed. On the upper layer side of the inter-layer insulating film 42, the data line 6a and the relay electrode 6b are formed of the same conductive film. The data line 6a and the relay electrode 6b each include a conductive film such as a conductive polysilicon film, a metal silicide film, a metal film, or a metal compound film. The data line 6a is in conduction with the source region 1s via a contact hole 42a passing through the inter-layer insulating film 42, the etching stopper layer 49, the inter-layer insulating film 41, and the gate insulating layer 2. The relay electrode 6b is in conduction with the drain electrode 4a via a contact hole 42b passing through the inter-layer insulating film 42 and the etching stopper layer 49.

On the upper layer side of each of the data line 6a and the relay electrode 6b, an inter-layer insulating film 44 having translucency and including, for example, a silicon oxide film is formed. On the upper layer side of the inter-layer insulating film 44, the upper layer side light-shielding layer 7a and the relay electrode 7b are formed of the same conductive film. The inter-layer insulating film 44 includes a flattened surface. The upper layer side light-shielding layer 7a and the relay electrode 7b each include a conductive film such as a conductive polysilicon film, a metal silicide film, a metal film, or a metal compound film. The relay electrode 7b is in conduction with the relay electrode 6b via a contact hole 44a passing through the inter-layer insulating film 44. The upper layer side light-shielding layer 7a extends to overlap the data line 6a, and functions as a light-shielding layer. Note that the upper layer side light-shielding layer 7a may be brought into conduction with the capacitance line 5a.

On the upper layer side of each of the upper layer side light-shielding layer 7a and the relay electrode 7b, an inter-layer insulating film 45 having translucency and including, for example, a silicon oxide film is formed. On the upper layer side of the inter-layer insulating film 45, the pixel electrode 9a including, for example, an ITO film is formed. A contact hole 45a reaching the relay electrode 7b is formed in the inter-layer insulating film 45. The pixel electrode 9a is electrically connected to the relay electrode 7b via the contact hole 45a. As a result, the pixel electrode 9a is electrically connected to the drain region 1d via the relay electrode 7b, the relay electrode 6b, and the drain electrode 4a. The inter-layer insulating film 45 includes a flattened surface. On a surface side of the pixel electrode 9a, the first orientation film 16 having translucency and including a polyimide or an inorganic orientation film is formed.

Configuration of Peripheral Circuit 106

Figure 7:
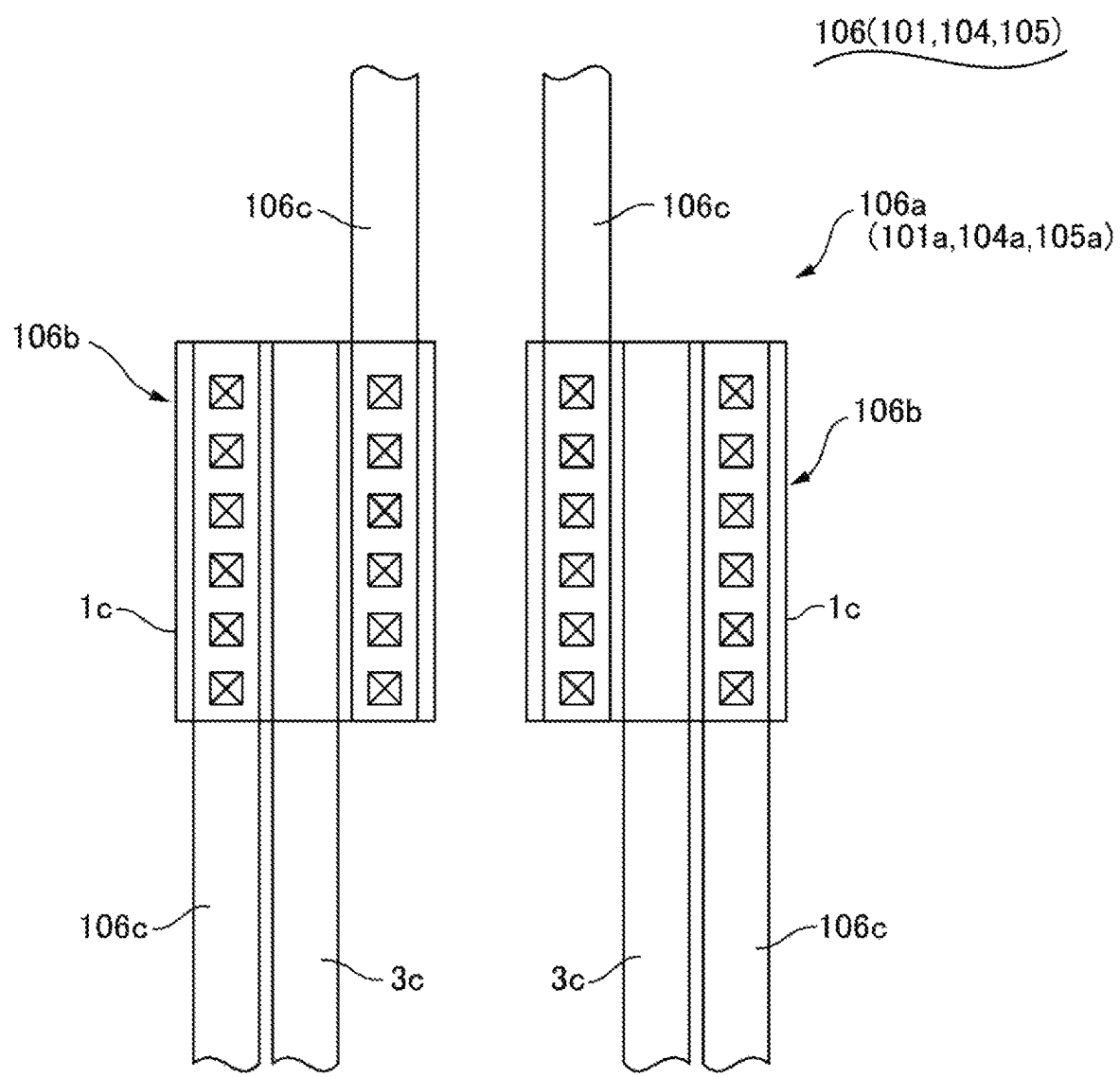
FIG. 7 is an explanatory view illustrating a unit circuit provided in a peripheral circuit of the electro-optical device illustrated in FIG. 1.

FIG. 7 is an explanatory view of a unit circuit provided in the peripheral circuit 106 of the electro-optical device 100 illustrated in FIG. 1. In FIG. 7, the peripheral circuit 106 (the data line driving circuit 101, the scan line driving circuit 104, and the inspection circuit 105) illustrated in FIG. 3 each include a plurality of semiconductor elements 106b and a plurality of lines of wiring 106c electrically connecting the plurality of semiconductor elements 106b to one another. Moreover, each of the unit circuits 101a, 104a, and 105a of the data line driving circuit 101, the scan line driving circuit 104, and the inspection circuit 105 includes one semiconductor element 106b or the plurality of semiconductor elements 106b electrically connected via the plurality of lines of wiring 106c. The semiconductor element 106b includes, as with the pixel switching element 30, a field effect transistor, and includes a semiconductor layer 1c located in the same layer as the semiconductor layer 1a of the pixel switching element 30, and a gate line 3c located in the same layer as the scan line 3a.

Here, since the unit circuits 106a (unit circuits 101a, 104a, and 105a) are each provided to correspond to each of the plurality of data lines 6a and the plurality of scan lines 3a, the semiconductor element 106b, the wiring 106c, and the gate line 3c are arranged in each peripheral circuit 106 to reduce area occupied by the peripheral circuit 106 in accordance with a predetermined rule.

Light-Shielding Structure

Figure 8:
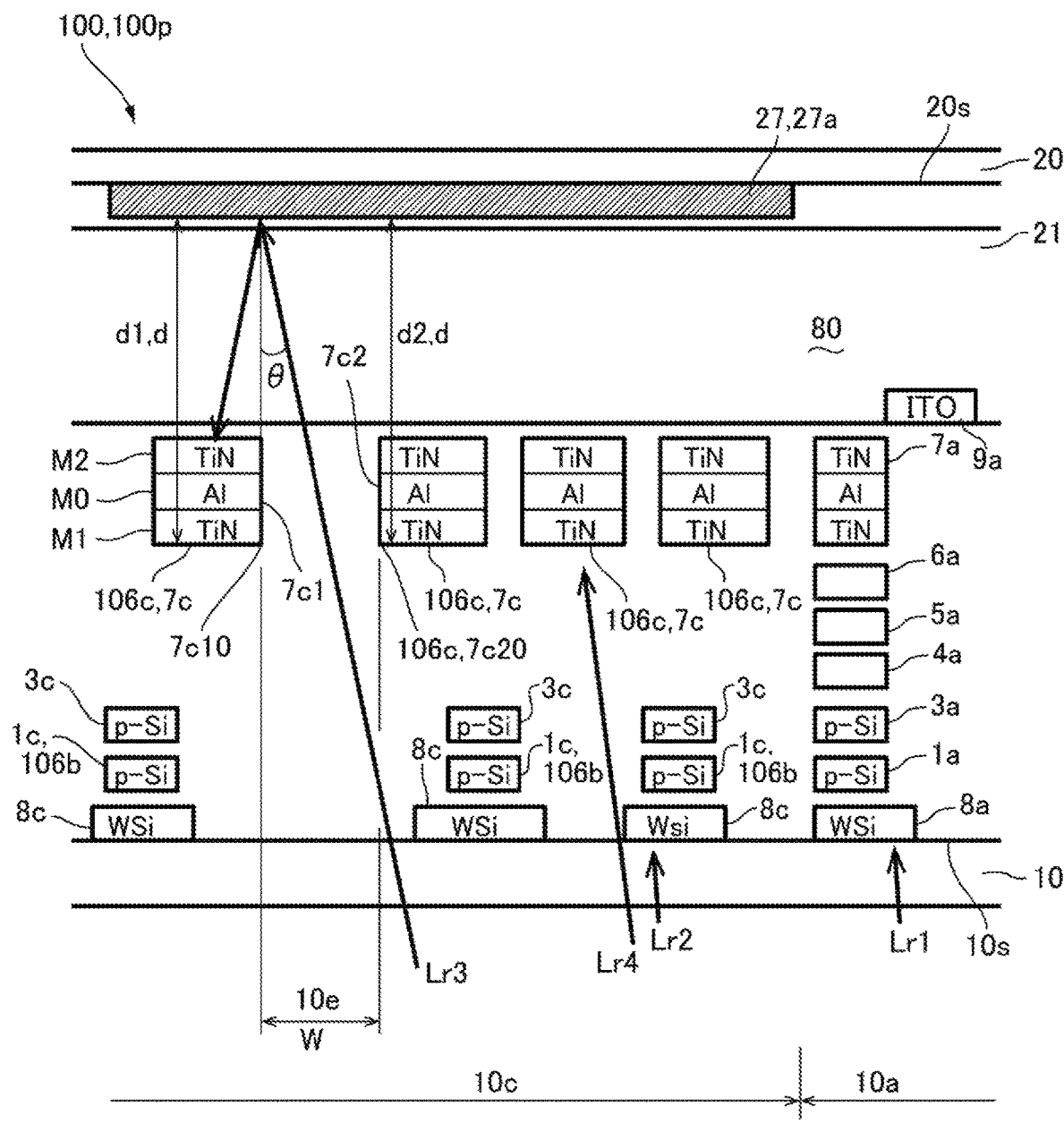
FIG. 8 is an explanatory view illustrating a light-shielding structure of the electro-optical device illustrated in FIG. 1.
Figure 9:
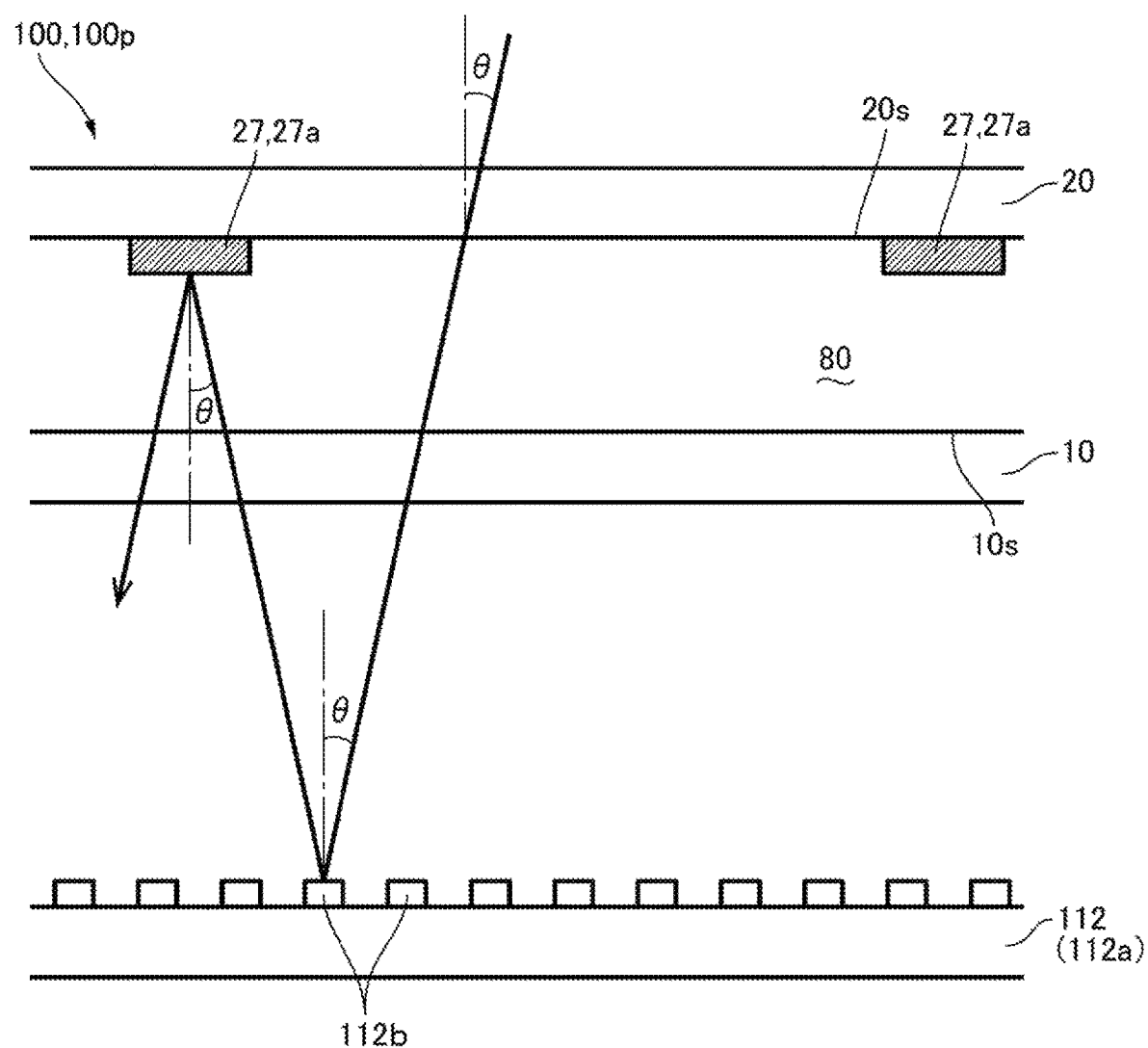
FIG. 9 is an explanatory view illustrating a maximum incident angle and the like illustrated in FIG. 8.
Figure 10:
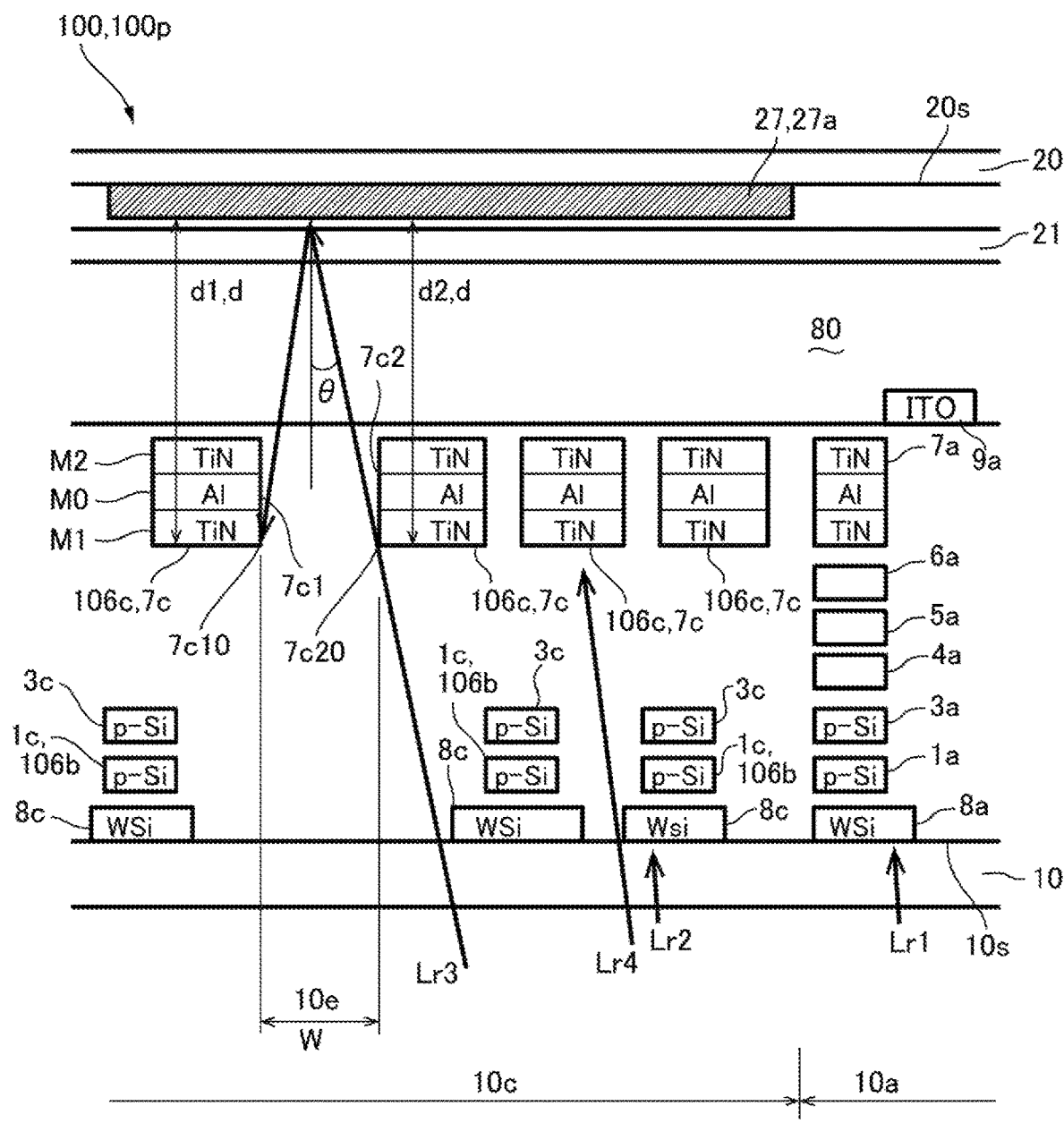
FIG. 10 is an explanatory view illustrating how light incident, at the maximum incident angle illustrated in FIG. 9, on an electro-optical layer from a second substrate is blocked.

FIG. 8 is an explanatory view illustrating a light-shielding structure of the electro-optical device 100 illustrated in FIG. 1. FIG. 9 is an explanatory view of a maximum incident angle θ and the like illustrated in FIG. 8. FIG. 10 is an explanatory view illustrating how light incident at the maximum incident angle θ illustrated in FIG. 9 on the electro-optical layer 80 from the second substrate 20 is blocked. In the exemplary embodiment, as illustrated in FIG. 2, a light-shielding structure in which when modulated light is emitted toward the side opposite to the second substrate 20 with respect to the first substrate 10, the modulated light is reflected by an optical system, a wire grid polarized light separating element, or the like disposed on the side opposite to the second substrate 20 with respect to the first substrate 10, and when the modulated light is incident on the first substrate 10 as return light Lr1, and Lr2 to Lr4, the return light Lr1, and Lr2 to Lr4 are blocked.

First, as illustrated in FIG. 8, on the first substrate 10, the light-shielding layer 8a is provided between the pixel switching element 30 and the first substrate 10. Therefore, when the return light Lr1 is incident on the first substrate 10, the return light Lr1 incident on the semiconductor layer 1a can be suppressed, and thus a malfunction due to photocurrent can be prevented from occurring in the pixel switching element 30.

Moreover, in the electro-optical device 100 according to the exemplary embodiment, in constituting the peripheral circuit 106 in the peripheral region 10c, in the peripheral region 10c, the semiconductor element 106b is provided on the one surface 10s side of the first substrate 10 and the gate line 3c is provided on the side opposite to the first substrate 10 with respect to the semiconductor layer 1c of the semiconductor element 106b. Moreover, the wiring 106c is provided on the side opposite to the first substrate 10 with respect to the gate line 3c. The semiconductor layer 1c is a polysilicon film (p-Si) located in the same layer as the semiconductor layer 1a, and the gate line 3c is a conductive polysilicon film (p-Si) located in the same layer as the scan line 3a.

Here, between the semiconductor element 106b and the first substrate 10, a second light-shielding layer 8c overlapping in a plan view the semiconductor layer 1c of the semiconductor element 106b is provided. Therefore, when the return light Lr2 is incident on the first substrate 10, the return light Lr2 incident on the semiconductor layer 1c illustrated in FIG. 8 can be suppressed. Accordingly, a malfunction due to photocurrent can be prevented from occurring at the semiconductor element 106b. The second light-shielding layer 8c includes, for example, a tungsten silicide film (WSi) located in the same layer as the light-shielding layer 8a.

In the exemplary embodiment, on the first substrate 10, a third light-shielding layer 7c is provided between the semiconductor element 106b and the electro-optical layer 80 (between the second light-shielding layer 8c and the first light-shielding layer 27a). In the exemplary embodiment, the wiring 106c is constituted as light-shielding wiring located in the same layer as the upper layer side light-shielding layer 7a, and the third light-shielding layer 7c includes the wiring 106c (light-shielding wiring). The third light-shielding layer 7c includes, as with the upper layer side light-shielding layer 7a, a metal layer M0, a first low reflection layer M1 overlaid on the first substrate 10 side of the metal layer M0, a second low reflection layer M2 overlaid on the second substrate 20 side of the metal layer M0, and any of the first low reflection layer M1 and the second low reflection layer M2 has lower reflectance than reflectance of the metal layer M0. In the exemplary embodiment, the metal layer M0 is an aluminum layer (Al), and any of the first low reflection layer M1 and the second low reflection layer M2 is a titanium nitride layer (TiN).

In the peripheral region 10c of the first substrate 10, a translucent region 10e overlapping neither the second light-shielding layer 8c nor the third light-shielding layer 7c as the second substrate 20 is viewed from the first substrate 10 side is provided. The translucent region 10e overlaps neither the second light-shielding layer 8c nor the third light-shielding layer 7c between a first edge and a second edge, where the first edge and the second edge are two edges, which are spaced apart from each other, of the second light-shielding layer 8c and the third light-shielding layer 7c. In the exemplary embodiment, since an interval between the third light-shielding layers 7c is less than an interval between the second light-shielding layers 8c in a vicinity of the translucent region 10e as the second substrate 20 is viewed from the first substrate 10 side, the translucent region 10e is positioned between an edge 7c1 (first edge) of the third light-shielding layer 7c and an edge 7c2 (second edge) of the third light-shielding layer 7c spaced apart from the edge 7c1.

Here, the first light-shielding layer 27a is provided in the peripheral region 10c of the second substrate 20, and the first light-shielding layer 27a overlaps the translucent region 10e or the like in a plan view. Accordingly, in the peripheral region 10c of the first substrate 10, even when the return light Lr3 is incident on the translucent region 10e from the first substrate 10 side, the first light-shielding layer 27a can absorb the return light Lr3. Alternatively, even when the return light Lr3 is incident on the translucent region 10e from the first substrate 10 side, the return light Lr3 is reflected by the first light-shielding layer 27a to be absorbed by the third light-shielding layer 7c and the like.

Moreover, in the exemplary embodiment, when a maximum incident angle of light-source light being emitted from the second substrate 20 to the electro-optical layer 80 is $\theta$, a maximum width of the translucent region 10e is W, a thickness between an end portion 7c10 on the side opposite to the first light-shielding layer 27a of the edge 7c1 (first edge) of the third light-shielding layer 7c, and the first light-shielding layer 27a is d1, and a thickness between an end portion 7c20 on the side opposite to the first light-shielding layer 27a of the edge 7c2 (second edge) of the third light-shielding layer 7c, and the first light-shielding layer 27a is d2, the maximum incident angle $\theta$, the width W, the thickness d1, and the thickness d2 satisfy the following relationship:

$$W < (d1 \times \tan \theta + d2 \times \tan \theta).$$

In the exemplary embodiment, since any of the thickness d1 and the thickness d2 is equal to the thickness d, and the thickness d1 and the thickness d2 are equal to each other, the maximum incident angle $\theta$, the width W, and the thickness d satisfy the following relationship:

$$W < 2 \times d \times \tan \theta.$$

That is, as illustrated in FIG. 9, when the maximum incident angle of light-source light being incident on the electro-optical layer 80 from the second substrate 20 side is $\theta$, each of the incident angle and the reflection angle obtained when the light-source light is modulated to be emitted from the first substrate 10 and is then reflected at a wire grid 112b or the like of a wire grid polarization separation element 112a is $\theta$. Accordingly, each of the incident angle and the reflection angle obtained when the light reflected at the wire grid 112b or the like is obliquely incident on the translucent region 10e as the return light Lr3 illustrated in FIG. 8, and is then reflected at the first light-shielding layer 27a of the second substrate 20 is $\theta$. Therefore, as long as the condition of the above relationship is satisfied, even when the return light Lr3 is obliquely incident on the translucent region 10e in the peripheral region 10c of the first substrate 10, the return light Lr3 reaches the first light-shielding layer 27a of the second substrate 20 and is absorbed by the first light-shielding layer 27a, or is reflected by the first light-shielding layer 27a to be directed toward the third light-shielding layer 7c or the second light-shielding layer 8c.

More specifically, as illustrated in FIG. 10, in a case where the translucent region 10e is defined by the third light-shielding layer 7c and the second light-shielding layer 8c is largely spaced apart from the translucent region 10e, the return light Lr3 is incident on the first substrate 10 from the side opposite to the second substrate 20 and then passes through a vicinity of the end portion 7c20 of the edge 7c2 (second edge) of the third light-shielding layer 7c to advance toward the first light-shielding layer 27a. However, as long as the above relationship is satisfied, such light is reflected at the first light-shielding layer 27a and then, is to be blocked at the end portion 7c10 of the edge 7c1 (first edge) of the third light-shielding layer 7c.

Therefore, even when a configuration in which a light-shielding layer is entirely provided or a configuration in which all the gaps created between the light-shielding layers of the bottom layer side are covered with the light-shielding layer of the upper layer side is not employed, the return light Lr3 being incident on the peripheral region 10c of the first substrate 10 from the translucent region 10e and reflected on the first substrate 10 side or the second substrate 20 side to be guided to the side opposite to the second substrate 20 with respect to the first substrate 10 can be suppressed. Thus, deterioration of image quality due to return light being incident on the peripheral region 10c can be suppressed. More specifically, leakage of light to an edge of a displayed image can be suppressed.

Figure 13:
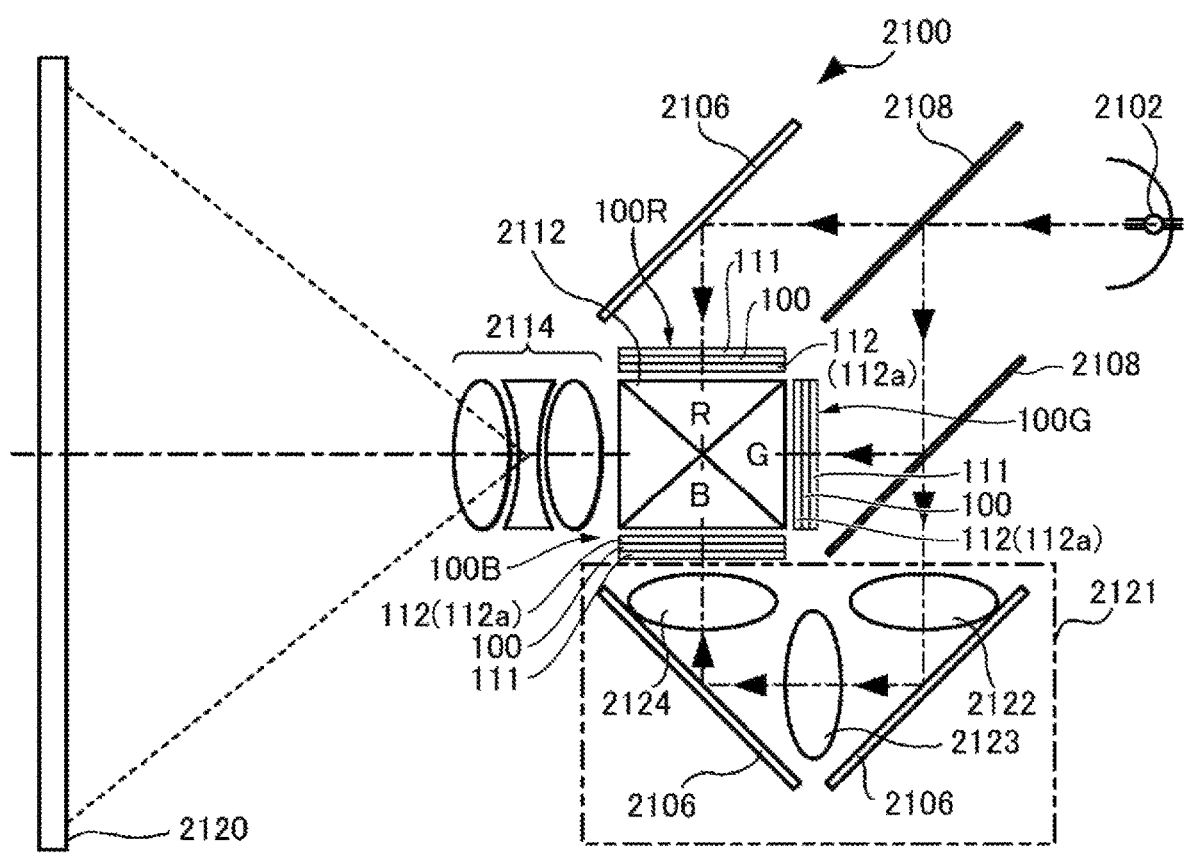
FIG. 13 is a schematic configuration view of a projection-type display device (electronic apparatus) using an electro-optical device to which the invention is applied.

Here, for example, in a projection-type display apparatus 2100 described below with reference to FIG. 13, the maximum incident angle $\theta$ has the following relationship with an F value of incident light (light-source light) on the electro-optical device 100:

$$\tan \theta = 1/(2 \times F).$$

Note that, in a region other than the translucent region 10e in the peripheral region 10c, the return light Lr4 being incident between the second light-shielding layers 8c is directly absorbed by the third light-shielding layer 7c.

Another Light-Shielding Structure of the Invention

Figure 11:
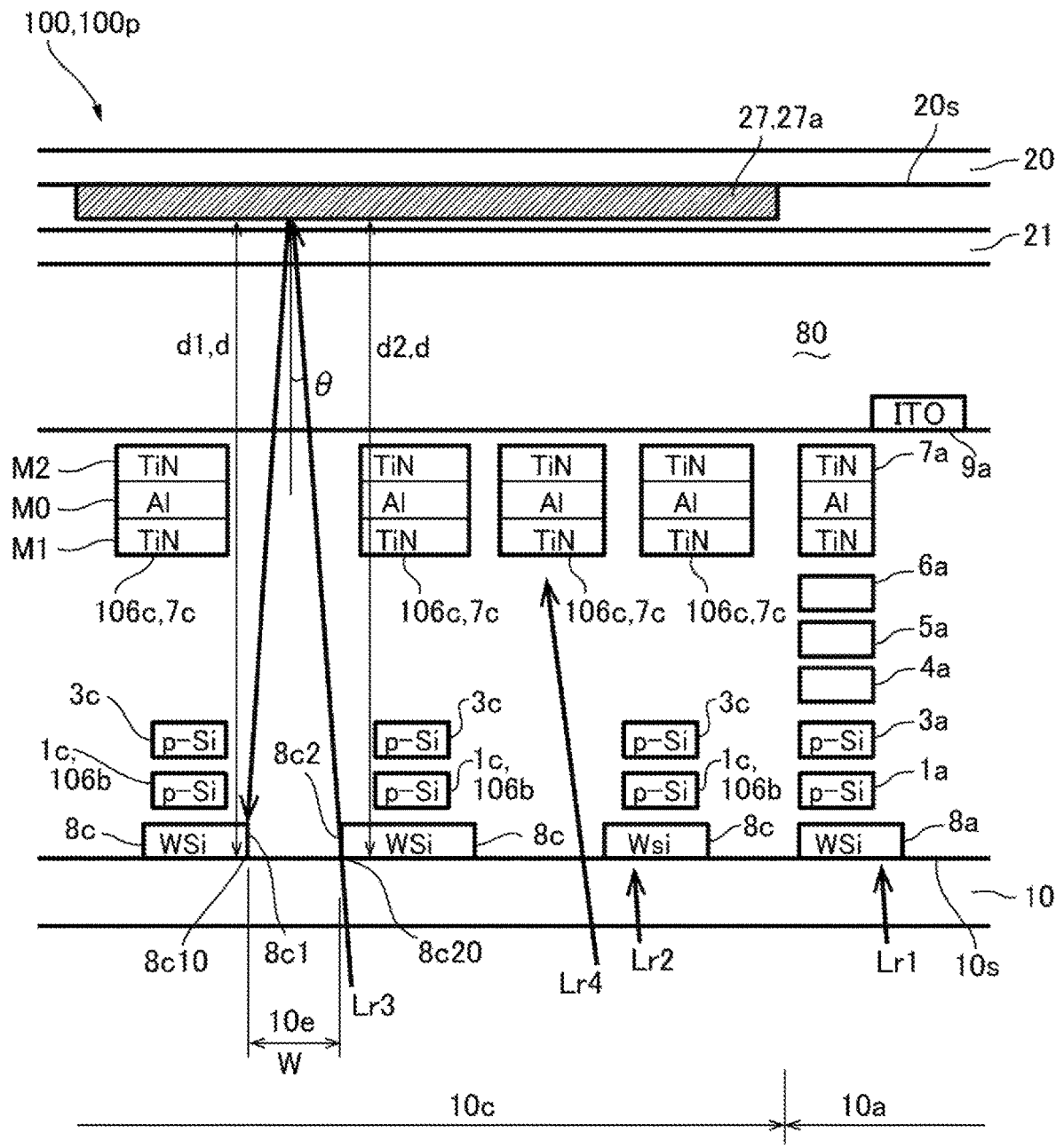
FIG. 11 is an explanatory view illustrating another light-shielding structure of the electro-optical device illustrated in FIG. 1.

FIG. 11 is an explanatory view illustrating another light-shielding structure of the electro-optical device 1 illustrated in FIG. 1. Note that a basic configuration of the light-shielding structure illustrated in FIG. 11 is identical to a basic configuration of the light-shielding structure described with reference to FIG. 8. Thus, common portions are denoted by the same reference signs, and detailed description of the common portions will be omitted.

The light-shielding structure illustrated in FIG. 11 includes, as with the light-shielding structure described with reference to FIG. 8, the light-shielding layer 8a overlapping in a plan view the semiconductor layer 1a and provided between the semiconductor layer 1a of the pixel switching element 30 and the first substrate 10 in the display region 10a of the first substrate 10. Moreover, in the peripheral region 10c of the first substrate 10, the second light-shielding layer 8c overlapping in a plan view with the semiconductor layer 1c is provided between the semiconductor layer 1c of the semiconductor element 106b and the first substrate 10. Moreover, in the peripheral region 10c of the first substrate 10, the third light-shielding layer 7c is provided between the semiconductor element 106b and the electro-optical layer 80 (between the second light-shielding layer 8c and the first light-shielding layer 27a). Moreover, in the peripheral region 10c of the first substrate 10, the translucent region 10e overlapping neither the second light-shielding layer 8c nor the third light-shielding layer 7c as the second substrate 20 is viewed from the first substrate 10 side is provided. The translucent region 10e is defined by an end portion of one of the second light-shielding layer 8c and the third light-shielding layer 7c.

In the exemplary embodiment, since the interval between the second light-shielding layers 8c is less than the interval between the third light-shielding layers 7c in the vicinity of the translucent region 10e as the second substrate 20 is viewed from the first substrate 10 side, the translucent region 10e is positioned between an edge 8c1 (first edge) of the second light-shielding layer 8c and an edge 8c2 (second edge) of the second light-shielding layer 8c spaced apart from the edge 8c1.

Here, the first light-shielding layer 27a is provided in the peripheral region 10c of the second substrate 20. Moreover, in the exemplary embodiment, the maximum incident angle θ of light-source light being emitted from the second substrate 20 to the electro-optical layer 80, the maximum width W of the translucent region 10e, the thickness d1 between an end portion 8c10 on the side opposite to the first light-shielding layer 27a of the edge 8c1 (first edge) of the second light-shielding layer 8c, and the first light-shielding layer 27a, and the thickness d2 between an end portion 8c20 on the side opposite to the first light-shielding layer 27a of the edge 8c2 (second edge) of the second light-shielding layer 8c, and the first light-shielding layer 27a satisfy the following relationship:

$W<(d1\times\tan\theta+d2\times\tan\theta)$.

In the exemplary embodiment, since any of the thickness d1 and the thickness d2 is equal to the thickness d, the maximum incident angle θ, the width W, and the thickness d satisfy the following relationship:

$W<2\times d\times\tan\theta$.

Accordingly, even when the return light Lr3 is obliquely incident on the translucent region 10e in the peripheral region 10c of the first substrate 10, the return light Lr3 reaches the first light-shielding layer 27a of the second substrate 20 and is absorbed by the first light-shielding layer 27a, or is reflected by the first light-shielding layer 27a to be directed toward the second light-shielding layer 8c or the third light-shielding layer 7c. Therefore, even when a configuration in which a light-shielding layer is entirely provided or a configuration in which all the gaps created between the light-shielding layers of the bottom layer side are covered with the light-shielding layer of the upper layer side is not employed, the return light Lr3 being incident on the peripheral region 10c of the first substrate 10 from the translucent region 10e is less likely to be guided to the side opposite to the second substrate 20 with respect to the first substrate 10. Thus, deterioration of image quality due to return light being incident on the peripheral region 10c can be suppressed. More specifically, leakage of light to an edge of a displayed image can be suppressed.

Still Another Light-Shielding Structure of the Invention

Figure 12:
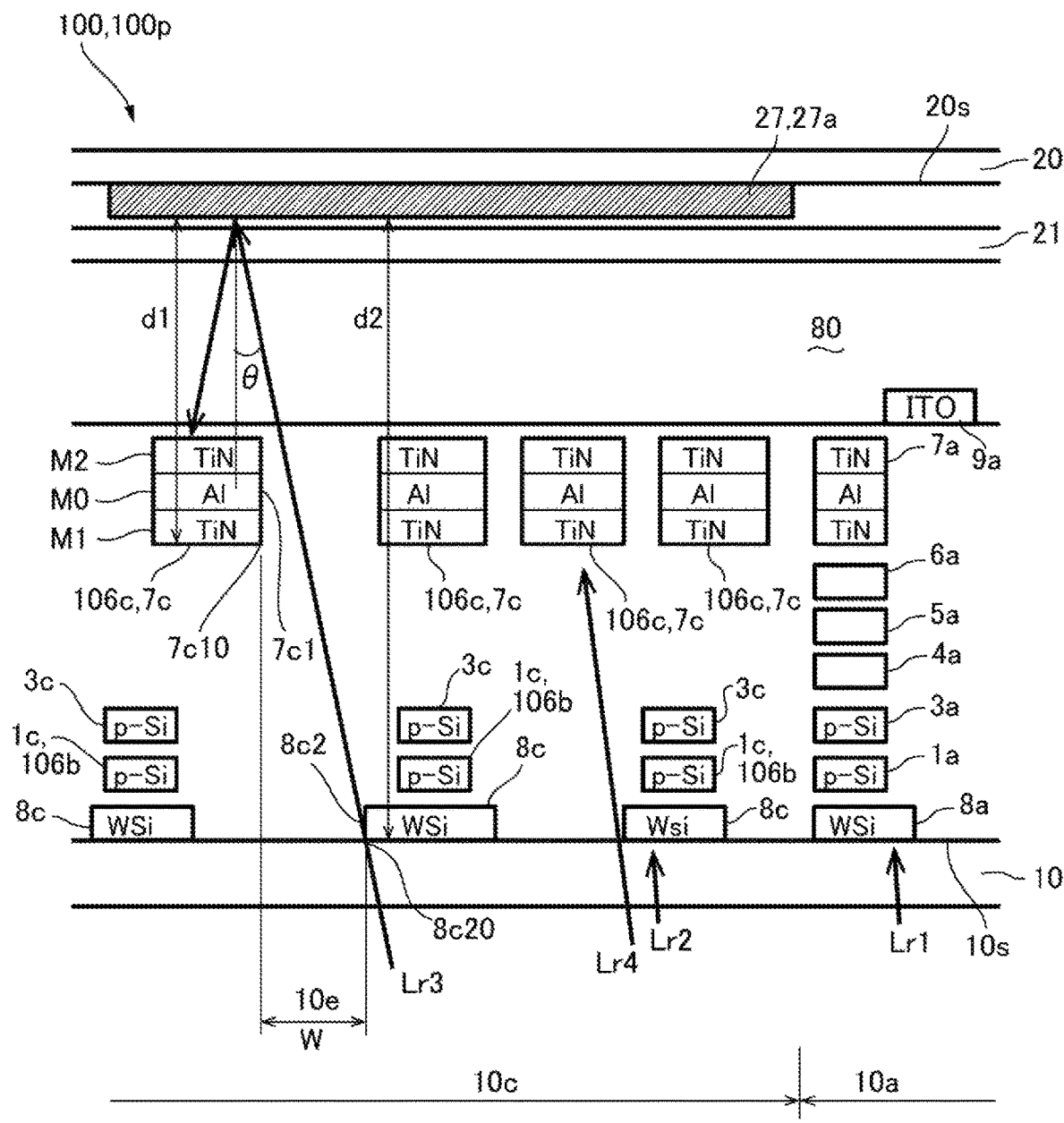
FIG. 12 is an explanatory view illustrating still another light-shielding structure of the electro-optical device illustrated in FIG. 1.

FIG. 12 is an explanatory view illustrating still another light-shielding structure of the electro-optical device illustrated in FIG. 1. Note that a basic configuration of the light-shielding structure illustrated in FIG. 12 is identical to the basic configuration of the light-shielding structure described with reference to FIG. 8, and thus, common portions are denoted by the same reference signs, and detailed description of the common portions will be omitted.

The light-shielding structure illustrated in FIG. 12 includes, as with the light-shielding structure described with reference to FIG. 8, the light-shielding layer 8a overlapping in a plan view the semiconductor layer 1a and provided between the semiconductor layer 1a of the pixel switching element 30 and the first substrate 10 in the display region 10a of the first substrate 10. Moreover, in the peripheral region 10c of the first substrate 10, the second light-shielding layer 8c overlapping in a plan view the semiconductor layer 1c is provided between the semiconductor layer 1c of the semiconductor element 106b and the first substrate 10. Moreover, in the peripheral region 10c of the first substrate 10, the third light-shielding layer 7c is provided between the semiconductor element 106b and the electro-optical layer 80 (between the second light-shielding layer 8c and the first light-shielding layer 27a). Moreover, in the peripheral region 10c of the first substrate 10, the translucent region 10e overlapping neither the second light-shielding layer 8c nor the third light-shielding layer 7c as the second substrate 20 is viewed from the first substrate 10 side is provided.

In the exemplary embodiment, the translucent region 10e is positioned between the edge 7c1 (first edge) of the third light-shielding layer 7c and the edge 8c2 (second edge) of the second light-shielding layer 8c spaced apart from the edge 7c1, as the second substrate 20 is viewed from the first substrate 10 side.

Here, the first light-shielding layer 27a is provided in the peripheral region 10c of the second substrate 20. Moreover, in the exemplary embodiment, the maximum incident angle θ of light-source light emitted from the second substrate 20 to the electro-optical layer 80, the maximum width W of the translucent region 10e, the thickness d1 between the end portion 7c10 on the side opposite to the first light-shielding layer 27a of the edge 7c1 (first edge) of the third light-shielding layer 7c, and the first light-shielding layer 27a, and the thickness d2 between the end portion 8c20 on the side opposite to the first light-shielding layer 27a of the edge 8c2 (second edge) of the second light-shielding layer 8c, and the first light-shielding layer 27a satisfy the following relationship:

$W<(d1\times\tan\theta\times d2\times\tan\theta)$.

Accordingly, even when the return light Lr3 is obliquely incident on the translucent region 10e in the peripheral region 10c of the first substrate 10, the return light Lr3 reaches the first light-shielding layer 27a of the second substrate 20 and is absorbed by the first light-shielding layer 27a, or is reflected by the first light-shielding layer 27a to be directed toward the second light-shielding layer 8c or the third light-shielding layer 7c. Therefore, even when a configuration in which a light-shielding layer is entirely provided or a configuration in which all the gaps created between the light-shielding layers of the bottom layer side are covered with the light-shielding layer of the upper layer side is not employed, the return light Lr3 being incident on the peripheral region 10c of the first substrate 10 from the translucent region 10e is less likely to be guided to the side opposite to the second substrate 20 with respect to the first substrate 10. Thus, deterioration of image quality due to return light being incident on the peripheral region 10c can be suppressed. More specifically, leakage of light to an edge of a displayed image can be suppressed.

Other Exemplary Embodiments

In the above exemplary embodiment, each of the regions where the data line driving circuit 101, the scan line driving circuit 104, and the inspection circuit 105 are provided includes the second light-shielding layer 8c, the third light-shielding layer 7c, and the translucent region 10e as a region where the peripheral circuit 106 is provided. However, the second light-shielding layer 8c, the third light-shielding layer 7c, and the translucent region 10e may be provided in a region where a portion of the peripheral circuit 106 is provided among the data line driving circuit 101, the scan line driving circuit 104, and the inspection circuit 105. Although in the above-described exemplary embodiment, description is made on the case where the third light-shielding layer 7c includes the wiring 106c, the third light-shielding layer 7c may be provided in a layer different from the wiring 106c.

Installation Example to Electronic Apparatus

An electronic apparatus using the electro-optical device 100 according to the above-described exemplary embodiments will be described below. FIG. 13 is a schematic configuration view of a projection-type display device (electronic apparatus) using the electro-optical device 100 to which the invention is applied. The projection-type display apparatus 2100 illustrated in FIG. 13 is an example of an electronic apparatus using the electro-optical device 100. In the projection-type display apparatus 2100, the electro-optical device 100 is used for a light valve, and high-definition and bright display can be made without increasing a size of the apparatus. As illustrated in this figure, a lamp unit 2102 (light-source unit) including a white light source such as a halogen lamp is provided inside the projection-type display apparatus 2100. Projection light emitted from the lamp unit 2102 is split into three primary colors of R (red), G (green), and B (blue) by three mirrors 2106 and two dichroic mirrors 2108 installed inside. The split projection light is guided to light valves 100R, 100G, and 100B corresponding to the primary colors, respectively and modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color. Here, each of the light valves 100R, 100G, and 100B includes an incident-side polarization separation element 111 overlapping on the incident side with the electro-optical device 100, and an emission-side polarization separation element 112 overlapping on the emission side with the electro-optical device 100.

The light modulated by each of the light valves 100R, 100G, and 100B is incident on a dichroic prism 2112 from three directions. Then, at the dichroic prism 2112, the light of the R color and the light of the B color are reflected at 90 degrees, and the light of the G color is transmitted. Accordingly, an image of the primary colors are synthesized, and subsequently a color image is projected on a screen 2120 by a projection lens group 2114 (projection optical system).

In the projection-type display apparatus 2100 (electronic apparatus) configured in this way, the light having passed through the light valves 100R, 100G, and 100B is reflected by the dichroic prism 2112 and the projection lens group 2114, and is occasionally incident on the first substrate 10 as the return light Lr1, and Lr2 to Lr4 illustrated in FIG. 2, FIG. 8, and FIG. 11. Even in this case, the electro-optical device 100 to which the invention is applied can suppress reemission of the return light Lr1, and Lr2 to Lr4 from the first substrate 10.

Moreover, when the wire grid polarization separation element 112a is disposed as the emission-side polarization separation element 112 in an optical path from the electro-optical device 100 to the projection lens group 2114 (projection optical system), a portion of light having passed through the electro-optical device 100 is reflected by the wire grid polarization separation element 112a and thus, the return light Lr1, and Lr2 to Lr4 illustrated in FIG. 2, FIG. 8, and FIG. 11 is likely to be incident on the first substrate 10. Even in this case, the electro-optical device 100 to which the invention is applied can suppress reemission of the return light Lr1, and Lr2 to Lr4 from the first substrate 10.

Other Projection-Type Display Apparatuses

Note that the projection-type display apparatus may include a configuration in which an LED light source or the like configured to emit light of each color is used as a light source unit and the light of each color emitted from the LED light source is supplied to another liquid-crystal device.

Other Electronic Apparatuses

The electronic apparatus including the electro-optical device 100 to which the invention is applied is not limited to the projection-type display apparatus 2100 of the above-described exemplary embodiment. Examples of the electronic apparatus may include a projection-type Head Up Display (HUD), a direct-view type Head Mounted Display (HMD), a personal computer, a digital still camera, and a liquid crystal television.

The entire disclosure of Japanese Patent Application No. 2018-032899, filed Feb. 27, 2018 is expressly incorporated by reference herein.

What is claimed is:
1. An electro-optical device, comprising:
an electro-optical panel including a first substrate, a second substrate facing the first substrate, and an electro-optical layer provided between the first substrate and the second substrate,
wherein the second substrate includes a first light-shielding layer in a peripheral region surrounding a display region, and
wherein the first substrate includes, in the peripheral region surrounding the display region, a second light-shielding layer, a third light-shielding layer and a translucent region, the third light-shielding layer being disposed in a layer located between the second light-shielding layer and the first light-shielding layer, and the translucent region being overlapping neither the second light-shielding layer nor the third light-shielding layer between a first edge of the second light-shielding layer and a second edge of the third light-shielding layer, in a view from the first substrate side, the first edge and the second edge being spaced apart from each other, and
wherein $W < (d1 \times \tan \theta \times d2 \times \tan \theta)$, $\theta$ being a maximum incident angle of light-source light that incidents on the electro-optical layer from the second substrate, W being a maximum width of the translucent region, d1 being a thickness between an end portion of the first edge at a side opposite to the first light-shielding layer and the first light shielding layer, and d2 being a thickness between an end portion of the second edge at a side opposite to the first light-shielding layer and the first light-shielding layer.

2. The electro-optical device according to claim 1, wherein
the third light-shielding layer includes
a metal layer,
a first low reflection layer overlaid on the metal layer at the first substrate side and having lower reflectance than reflectance of the metal layer, and
a second low reflection layer overlaid on the metal layer at the second substrate side and having lower reflectance than reflectance of the metal layer.

3. The electro-optical device according to claim 1, wherein
the third light-shielding layer includes light-shielding wiring electrically connected to a semiconductor element formed in the peripheral region.

4. The electro-optical device according to claim 3, wherein
a plurality of unit circuits including the semiconductor element are arranged in the peripheral region.

5. The electro-optical device according to claim 1, wherein
the first edge and the second edge both include an edge of the third light-shielding layer.

6. The electro-optical device according to claim 1, wherein
the first edge and the second edge both include an edge of the second light-shielding layer.

7. The electro-optical device according to claim 1, wherein
the first edge includes an edge of the third light-shielding layer, and
the second edge includes an edge of the second light-shielding layer.

8. The electro-optical device according to claim 1, comprising a holder configured to cover the electro-optical panel, wherein
the holder includes
a first end plate portion having a light-shielding property and configured to cover a surface of the second substrate on a side opposite to the first substrate, and
a second end plate portion having a light-shielding property and configured to cover a surface of the first substrate on a side opposite to the second substrate,
the first end plate portion is provided with a first opening portion overlapping the display region, and
the second end plate portion is provided with a second opening portion overlapping the display region.

9. An electronic apparatus comprising the electro-optical device according to claim 1.

10. The electronic apparatus according to claim 9, comprising
a light-source unit configured to emit light-source light to be supplied to the electro-optical device, and a projection optical system configured to project light modulated by the electro-optical device.

* * * * *